United States Patent [19]

Johnsen et al.

[11] Patent Number: 5,104,171

[45] Date of Patent: Apr. 14, 1992

[54] TAILGATE GUARD ASSEMBLY

[75] Inventors: Roger L. Johnsen, Houston, Tex.; Dimiter S. Zagaroff, Cambridge, Mass.

[73] Assignee: Steadfast Corporation, Chelsea, Mass.

[21] Appl. No.: 714,206

[22] Filed: Jun. 12, 1991

[51] Int. Cl.⁵ .......................................... B62D 25/00
[52] U.S. Cl. ...................................... 296/50; 296/57.1
[58] Field of Search ................................ 296/50, 57.1

[56] References Cited

U.S. PATENT DOCUMENTS

| | | | |
|---|---|---|---|
| 2,955,858 | 10/1960 | Trammel, Jr. | 292/1 |
| 3,624,317 | 11/1971 | Buckingham | 179/189 R |
| 4,358,150 | 11/1982 | Nash | 296/50 |
| 4,529,351 | 7/1985 | Olins | 296/57.1 X |
| 4,584,856 | 4/1986 | Petersdorff et al. | 70/57 |
| 4,819,461 | 4/1989 | Pearson | 70/14 |
| 4,918,952 | 4/1990 | Lakoski et al. | 70/57 |
| 4,968,084 | 11/1990 | Asher et al. | 296/50 |
| 4,981,320 | 1/1991 | Bowman | 296/57.1 |
| 5,004,287 | 4/1991 | Doyle | 296/57.1 |

Primary Examiner—Robert R. Song
Attorney, Agent, or Firm—Cesari and McKenna

[57] ABSTRACT

A tailgate guard assembly incorporates a metal plate that closes off the handle recess. The plate is stiffened by an inwardly extending skirt welded to the back of the plate so that the skirt projects into the handle recess to hinder direct access into the handle recess under the edge of the plate. A hinge section along the top edge of the plate hooks in behind the outer panel of the tailgate along the top of the handle recess. A lock disposed near the lower end of one of the sides of the handle recess has a locking dog that rotates to a locking position in which it latches behind the outer panel of the tailgate without any structural modifications or additions to the tailgate. Once the tailgate guard assembly is hooked by its hinge section to the tailgate, the assembly is swung downward toward the tailgate until the lock is positioned so that the locking dog can be turned to its locking position.

5 Claims, 2 Drawing Sheets

TAILGATE GUARD ASSEMBLY

FIELD OF THE INVENTION

This invention relates generally to anti-theft tailgate devices and more specifically to an anti-theft tailgate guard assembly which effectively prevents access to the tailgate handle for removal and theft of the tailgate.

BACKGROUND OF THE INVENTION

Located in the rear of the pickup truck, a tailgate closes of the rear of the cargo space. Upon the release of a latching mechanism, it may be swung down around a hinge to a horizontal position to facilitate access to the cargo space to load or unload the truck.

The tailgate has spaced-apart outer and inner panels. The outer panel is apertured to provide a recess that accommodates a handle connected to the latching mechanism. Specifically, pulling the handle draws a pair of rods from niches in the side panels of the truck and thereby releases the tailgate.

The tailgate of a pickup is particularly vulnerable to theft. One can easily remove it by unlatching it and then lifting it from its hinge. Thus, there is a real need for tailgate security.

A prior anti-theft device for tailgate covers the handle recess of the tailgate with a metal plate to prevent access to the tailgate handle. Upper hinges on the plate hook in underneath the outer panel at the top of the recess. A lock in the central lower portion of the plate has a dog that engages a latch on the bottom of the recess. To install the latch, holes must be drilled in a recess tab to which the latch is then fastened by screws. This is a rather cumbersome procedure and accurate placement of the holes is difficult. Additionally, these prior devices can be defeated by thieves without causing material damage to the tailgate.

SUMMARY OF THE INVENTION

It is a principal object of this invention to provide a tailgate guard assembly which can not be pried open without damaging the tailgate and thus effectively deters theft of the tailgate.

Another object of this invention is to provide a tailgate guard assembly which is simple to install.

Briefly, a tailgate guard assembly embodying the invention incorporates a metal plate that closes off the handle recess. The plate has a long hinge section along the top edge and an inwardly extending skirt that projects into the handle recess. The hinge section hooks in behind the tailgate outer panel along the top of the handle recess. A key-operated lock, disposed near the lower end of one of the sides of the tailgate guard assembly, includes a locking dog that is rotated to a locking position in which it latches behind the outer panel of the tailgate. The hinge section and the lock thus cooperate to secure the tailgate guard assembly to the tailgate.

The plate then covers the front of the handle recess while the skirt fits snugly within the handle recess. The skirt stiffens the plate and also hinders direct access into a tailgate recess under the edge of the plate. It is therefore difficult to pry the tailgate guard assembly from the tailgate without causing material damage to the tailgate. This effectively prevents theft of the tailgate, whose value is greatly diminished by significant damage.

The hinge section of the plate is constructed to provide a spring bias that urges the plate outwardly. When the tailgate guard assembly is locked on the tailgate, this spring bias forces the locking dog against the outer panel so that when the vehicle is in motion, the tailgate guard assembly does not rattle. When the tailgate lock is unlocked, the spring bias causes the plate to pop open so that the tailgate guard assembly can be easily removed for access to the release handle.

To install the tailgate guard assembly, the operator first removes and discards the plastic trim that is usually disposed around the tailgate release handle. Then the operator simply hooks the hinge behind the outer tailgate panel, along the upper margin of the handle recess, inserts the key into the lock, pushes the plate into place against the spring bias, and turns the lock to its closed position. To open the tailgate the operator simply inserts the key, turns the key until the lock is unlocked, removes the tailgate guard assembly, and pulls the tailgate release handle.

Unlike prior tailgate security devices, installation of the tailgate guard assembly does not require any drilling or other modification of the tailgate, other than the removal of the plastic trim. Thus, it is much easier to install than prior devices and the possibility of inaccurate alignment between the lock and the latch is eliminated.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
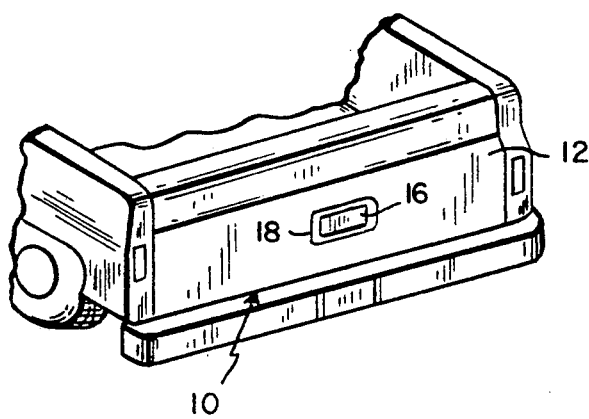
FIG. 1 is a frontal left perspective of the tailgate on the back of a pickup truck.

Referring to FIG. 1, of the drawings, reference numeral 10 designates generally a tailgate of a pickup truck. The tailgate 10 is shown in its upright and locked position, closing off the rear of the cargo space.

Figure 3:
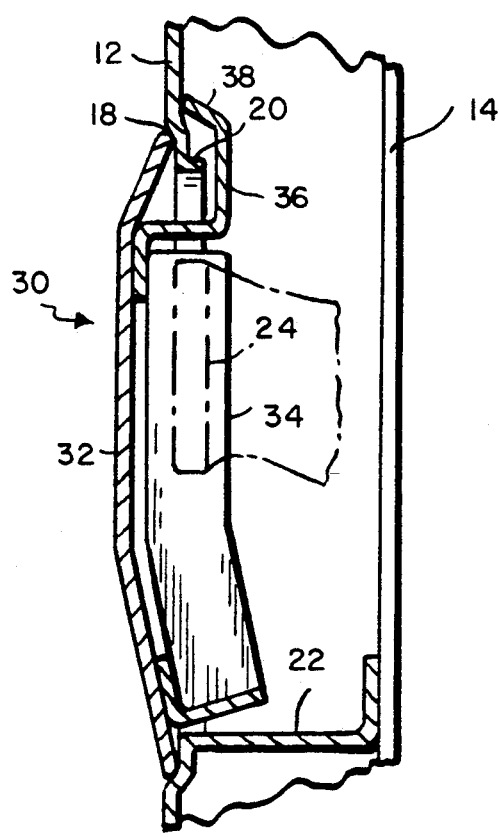
FIG. 3 is a sectional view taken along line 3—3 of FIG. 2.

As best seen in FIG. 3, the tailgate has an outer panel 12 spaced form an inner panel 14. As shown in FIGS. 1 and 3, the outer panel 12 is apertured to provide a handle recess 16 containing a release handle 24. The outer panel 12 is formed with an inwardly disposed shoulder 18 (FIG. 3) surrounding the recess 16. On three sides, the shoulder 18 terminates in an inwardly extending flange 20. Along the bottom of the recess, the panel 12 is bent over to form a tab 22 which extends from the shoulder 18 to the inner panel 14 and is fastened to the latter panel.

Connected at opposite ends of the handle 24 are rods 26 (FIG. 2) which extend to the respective ends of the tailgate 10 and engage in niches (not shown) in the corresponding sides of the truck. When latches, these rods 26 hold the tailgate 10 in the upright position. When the handle 24 is pulled, the rods 26 unlatch and the tailgate 10 is released to swing down around hinges (not shown) to a horizontal position.

Figure 2:
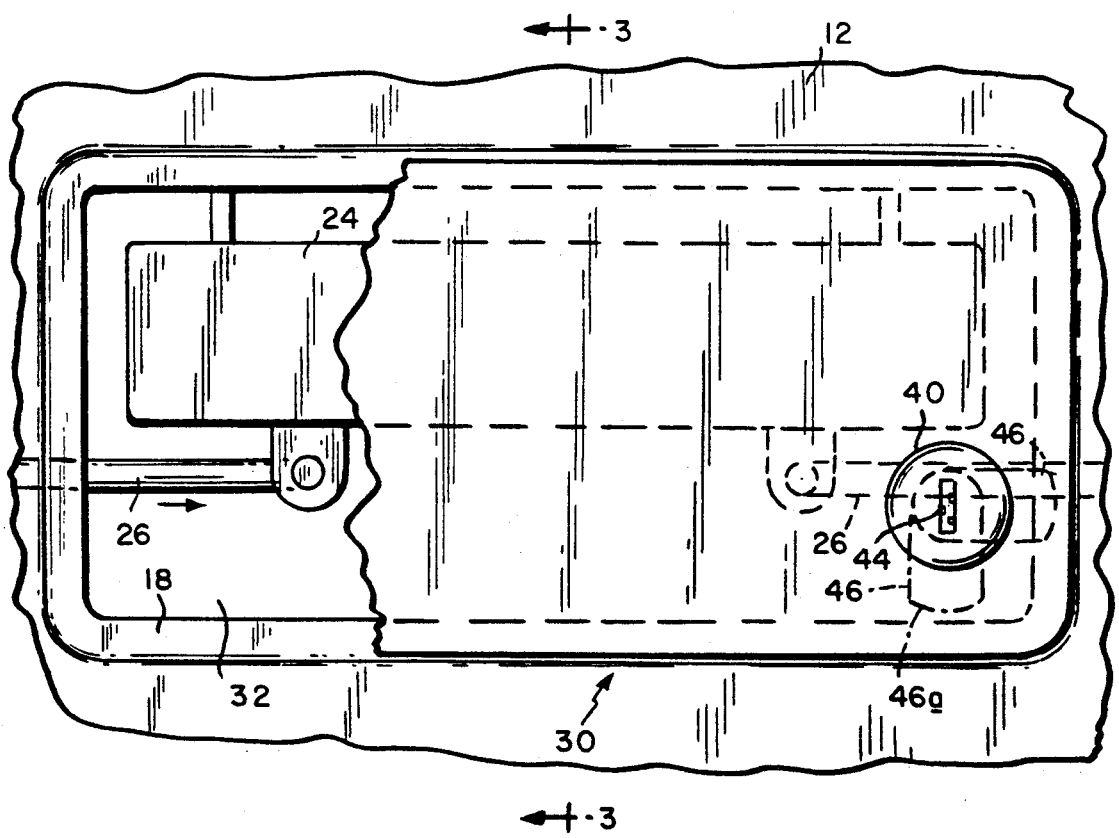
FIG. 2 is a frontal view of the tailgate guard assembly in its locked position on a tailgate.
Figure 4:
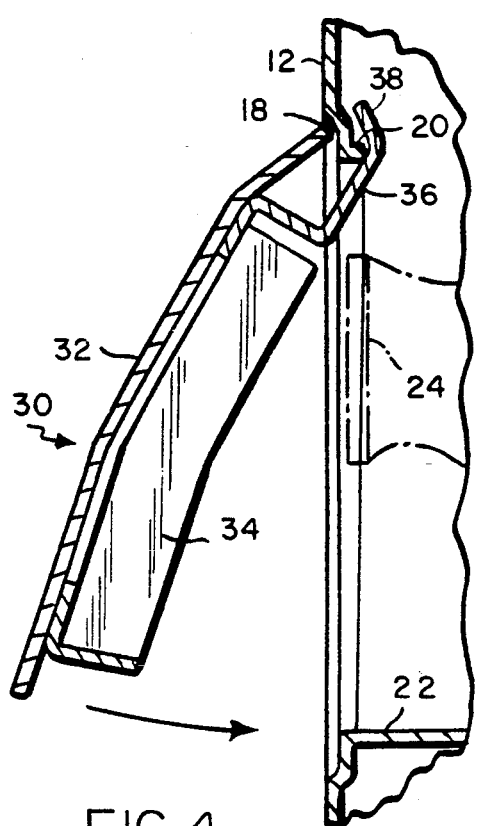
FIG. 4 is right view of the tailgate guard assembly being inserted into a tailgate.
Figure 5:
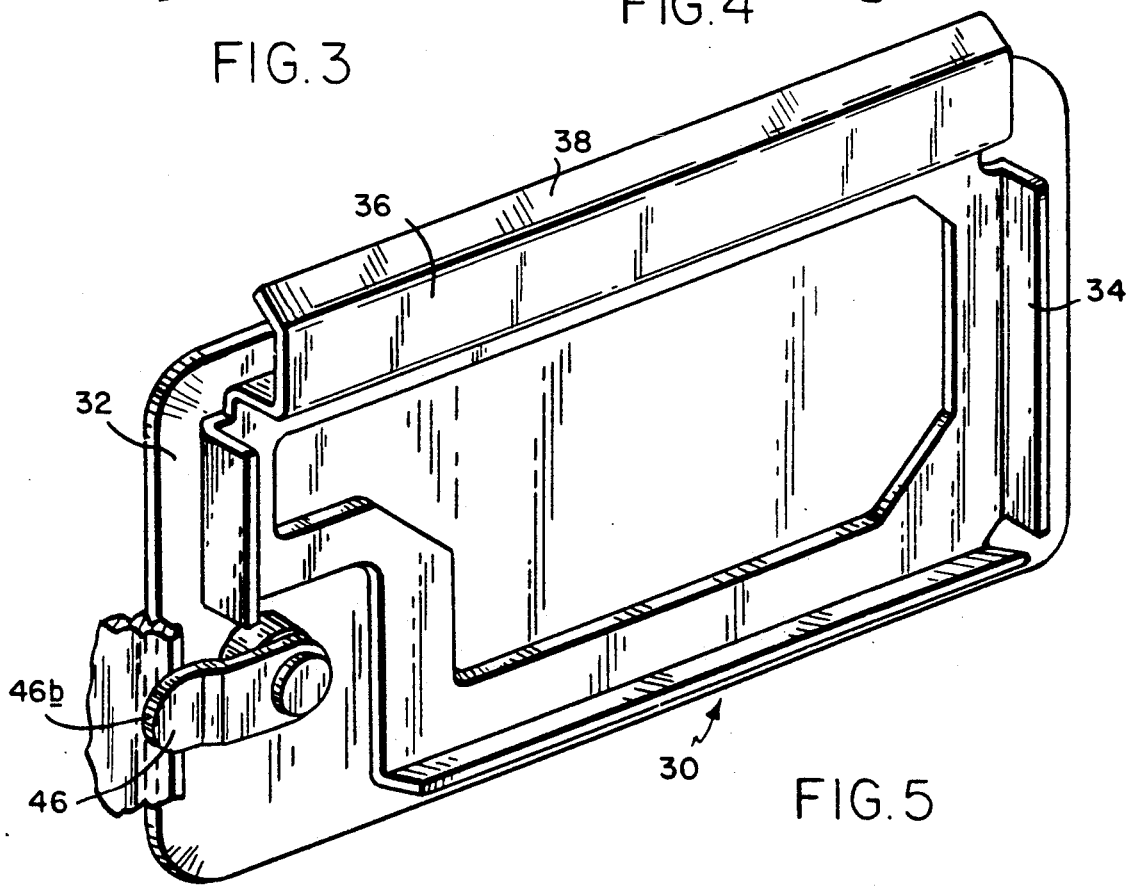
FIG. 5 is a rear view of the tailgate guard assembly in its locked position on the tailgate.

As shown in FIGS. 3, 4 and 5, a tailgate guard assembly 30 comprises a concave plate 32 that fits the shoulder 18 (FIG. 2). A rigid skirt 34 is welded to the back of the plate 32 so that when the plate is in its locked position on the tailgate 10, the skirt 34 extends from the plate toward the inner panel 14 and interfits within the boundaries of the handle recess 16 from beneath the edges of the plate 32. The skirt 34 stiffens the plate 32 and also prevents direct access into the handle recess 16. Along the top of the plate 32, the skirt 34 flares at its free end t form a hinge 36 having a lip 38 which hooks in behind the outer panel 12 along the top of the handle recess 16. An opening 40 in the lower right hand region of the plate 32 contains a lock 42. The skirt 36 is relieved as shown so as not to interfere with the lock 42.

As shown in FIGS. 2, 3 and 5, the lock 42 is a conventional lock having a key-operated cylinder 44 and a dog 46 fastened to the inner end of the cylinder 44. The cylinder 44 rotates the dog 46 from an opened position 46a to a closed position 46b. In its closed position ,the dog 46 catches behind flange 20 adjacent to the lower end of the right hand side of the handle recess 16, thereby locking the tailgate guard assembly 30 to the tailgate 10.

During installation of the tailgate guard assembly 30, the hinge 36 is slidably fitted underneath the top of the handle recess 16 and behind the outer panel 12. The lip 38 engages the back of the outer panel 12 before the plate 32 engages the shoulder 18, creating a spring action which pushes the lip 38 against the outer panel 12. After it is hinged, the tailgate guard assembly 30 is pushed against this bias, toward and against the handle recess 16 and then locked in place by means of the cylinder lock 42. In this locked position, the tailgate guard assembly 30 hinders access to the handle 24.

The spring action, discussed above, reduces the chance that the tailgate guard assembly 30 will rattle when the vehicle, on which it is locked, is in motion. Additionally, when the lock 42 is unlocked, the bottom of the plate 32 pops up, making it easy to remove the tailgate guard assembly 30 from the tailgate.

If a prying device were slipped under an edge of the plate 32, the skirt 34 would prevent the device from entering the handle recess 16. Additionally, the stiffening of the plate 32 by the skirt 36, in and of itself, makes it more difficult to pry the tailgate guard assembly 30 from the tailgate 10.

The forgoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A tailgate guard assembly for attachment to a tailgate that has an outer panel spaced apart from an inner panel, wherein said outer panel is apertured with a recess housing a release handle of said tailgate, said outer panel having an inwardly disposed shoulder surrounding the recess, said assembly comprising:
   (A) a plate for fitting said shoulder and thereby covering said recess;
   (B) a skirt secured to the back of said plate, said skit stiffening said plate and interfitting within said recess to hinder access to said recess;
   (C) means along a first edge of said plate for attaching said plate to said tailgate; and
   (D) means adjacent to a second edge of said plate for locking said plate to said tailgate, said locking means cooperating with said attaching means so that when said locking means is locked, the tailgate guard assembly is substantially compressed against said tailgate.

2. A tailgate guard assembly as in claim 1 wherein said attaching means is a hinge member secured to the back of said plate, said hinge member being adapted for insertion through the recess and behind the outer panel of the tailgate so that said assembly can rotate about said hinge member inwardly toward said tailgate until said locking means is positioned to lock to said tailgate, the hinge member having a lip which engages the back of the outer panel before the plate is closed against the shoulder, thereby providing a spring bias that urges the plate outwardly from said tailgate.

3. A tailgate guard assembly as in claim 1 wherein said locking means is a key-operated lock attached to said plate, said lock having a dog which, when the lock is rotated to a locking position, engages behind the outer panel of the tailgate.

4. A tailgate guard assembly as in claim 2 wherein said skirt flares at its free end to form said hinge member.

5. A tailgate guard assembly as in claim 2 wherein said attaching means extends substantially the length of the top of the recess.

* * * * *

UNITED STATES PATENT AND TRADEMARK OFFICE
CERTIFICATE OF CORRECTION

PATENT NO. : 5,104,171

DATED : April 14, 1992

INVENTOR(S) : Roger L. Johnsen

It is certified that error appears in the above-identified patent and that said Letters Patent is hereby corrected as shown below:

Title Page, Item [75], the inventor's name "Zagaroff" should be changed to --Zagoroff--.

In column 1, line 12, delete "of" (first occurrence) and insert --off--.

In column 2, line 50, delete "form" and insert --from--.

In column 2, line 64, delete "latches" and insert --latched--.

In column 3, line 11, delete "t" and insert --to--.

In column 4, line 16, delete "skit" and insert --skirt--.

Signed and Sealed this

Fifteenth Day of June, 1993

Attest:

MICHAEL K. KIRK

*Attesting Officer*   *Acting Commissioner of Patents and Trademarks*